INVENTORS:
GEORGE W. OVERSTREET
WILLIAM A. OVERSTREET
BY

ATTORNEY

June 19, 1962 G. W. OVERSTREET ET AL 3,039,504
FRUIT PROCESSING MACHINE
Filed July 21, 1960 3 Sheets-Sheet 2
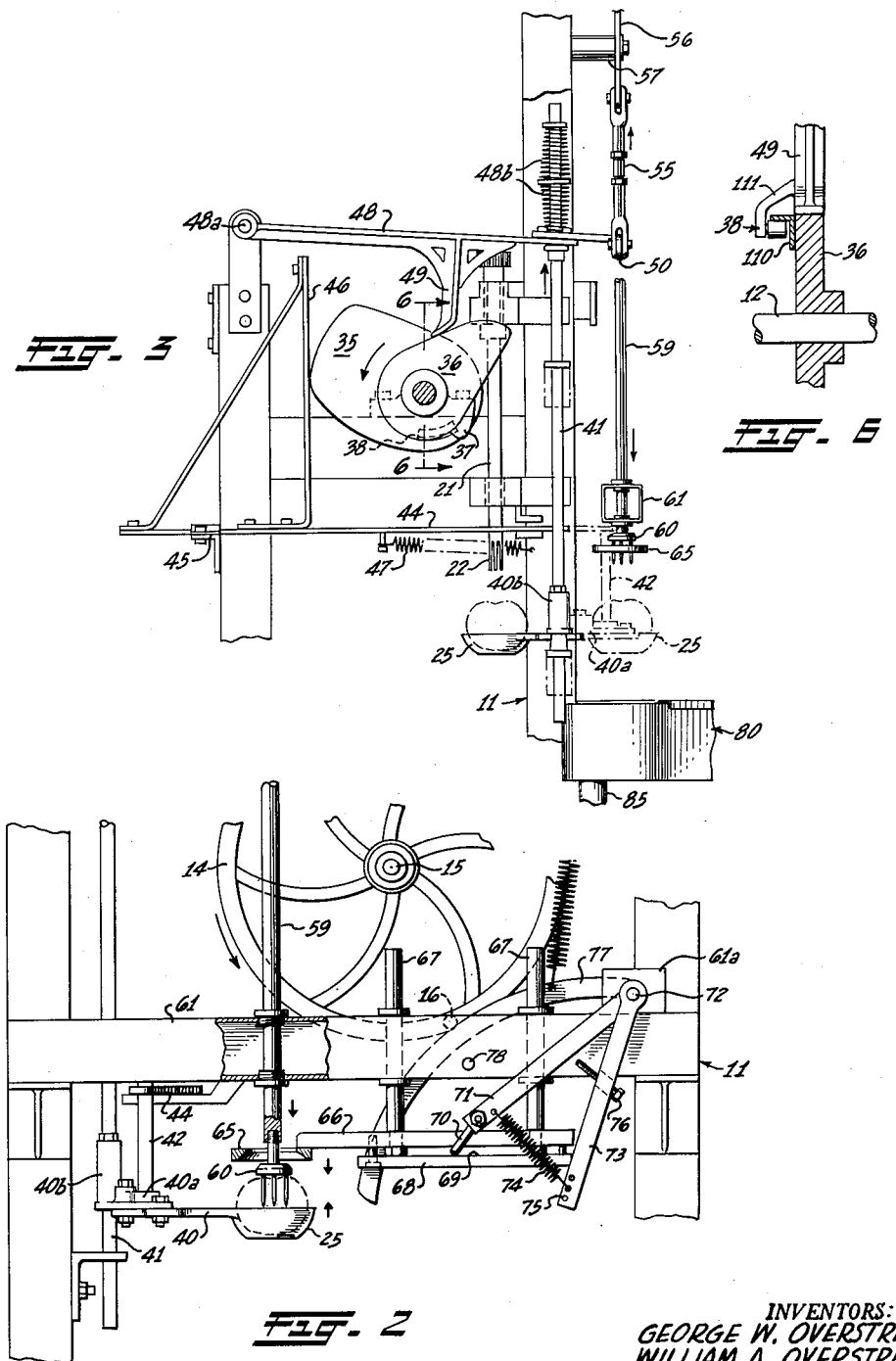
INVENTORS:
GEORGE W. OVERSTREET
WILLIAM A. OVERSTREET
BY
ATTORNEY June 19, 1962 G. W. OVERSTREET ET AL 3,039,504
FRUIT PROCESSING MACHINE
Filed July 21, 1960 3 Sheets-Sheet 3
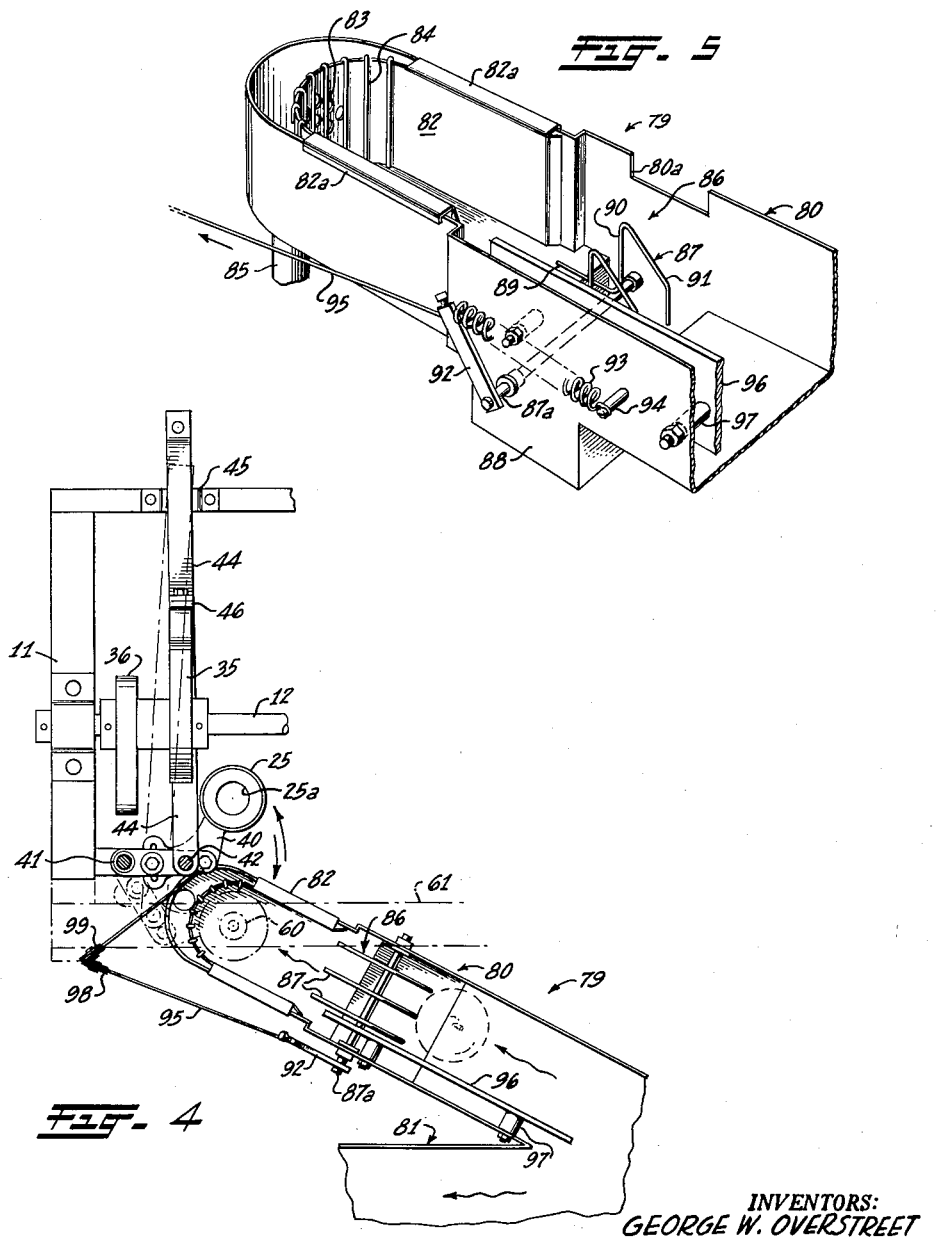
INVENTORS:
GEORGE W. OVERSTREET
WILLIAM A. OVERSTREET
BY
ATTORNEY United States Patent Office
3,039,504
Patented June 19, 1962

3,039,504
FRUIT PROCESSING MACHINE
George W. Overstreet and William A. Overstreet, Sebastopol, Calif., assignors to Sebastopol Cooperative Cannery, Sebastopol, Calif., a corporation of California
Filed July 21, 1960, Ser. No. 44,442
2 Claims. (Cl. 146—51)

This invention relates to a fruit processing machine. More particularly this invention relates to an improvement upon a well-known apple paring machine known as the "Pease Apple Peeler," hereinafter referred to as the "Pease machine." Our invention, however, has broader application e.g., to machines generally wherein whole fruits or vegetables are processed automatically in some manner.

The Pease machine is described in United States Reissue Patent No. 17,307 to John W. Pease, reissued May 28, 1929, entitled "Apple Paring Machine." In this machine a receptor cup is provided of a shape and size suitable for holding a single apple. This cup has an open top and an open bottom and it is mounted for horizontal swinging or pivotal movement and for vertical reciprocating movement. The cup pivots from an "out" position (which the cup occupies when an apple is deposited by a human operator) to an "in" position in which the cup is in alignment with the mechanism which is employed to core and peel the apple. When the cup is pivoted to its "in" position it is then moved vertically from a "down" position to an "up" position, and it is impaled by a fork in the "up" position. The cup then retracts to its "down" position and then pivots to its "out" position. A coring instrumentality and a paring knife are then brought into operative position to core the apple and pare it. The core is removed and the cored and pared apple is removed from the fork and is guided into a bin or other suitable receptacle or onto a conveyor.

As will be apparent from the above description and from an inspection of Pease Reissue Patent 17,307, a human operator places an apple in the cup during each cycle of operation of the machine while the cup is in its "out" and "down" position.

It has been recognized that an automatic feed to supply whole apples to this cup would be very desirable but, to our knowledge, no satisfactory means has been available because of certain difficult requirements. Each apple must be placed in the cup with its stem end uppermost and centered in relation to the cup. This must be carried out in timed relation to other operations of the machine.

It is an object of the present invention to provide improvements upon apple paring and other similar fruit and vegetable processing machines of the general character described.

It is a further object of the invention to provide a means for automatically supplying apples to the above-mentioned receptor cup of the Pease machine by automatic means, such means being operable to place each apple in the cup with its stem end uppermost and in vertical alignment with the cup, such operation being carried out in properly timed relation to other operations of the machine.

Yet another object of the invention is to provide an automatic apple (or other fruit or vegetable) feed means capable of supplying whole fruits or vegetables and the like automatically to a cup or other receptor member in timed relation to the cycle of operation of a machine which processes the fruit or vegetable.

The above and other objects of the invention will be apparent from the ensuing description and the appended claims.

One form of the invention is illustrated by way of example in the accompanying drawings, in which:

FIGURE 2 is a similar but fragmentary view and on a larger scale than that shown in FIGURE 1.

FIGURE 3 is a fragmentary view as seen from the left of FIGURE 1 but with certain parts removed.

FIGURE 4 is a view generally along the line 4—4 of FIGURE 1 showing in top plan the trough feed for the apples.

FIGURE 5 is a perspective view of the trough feed shown in FIGURE 4.

FIGURE 6 is a fragmentary view along the line 6—6 of FIGURE 3 but with moving parts in different relative positions.

Figure 1:
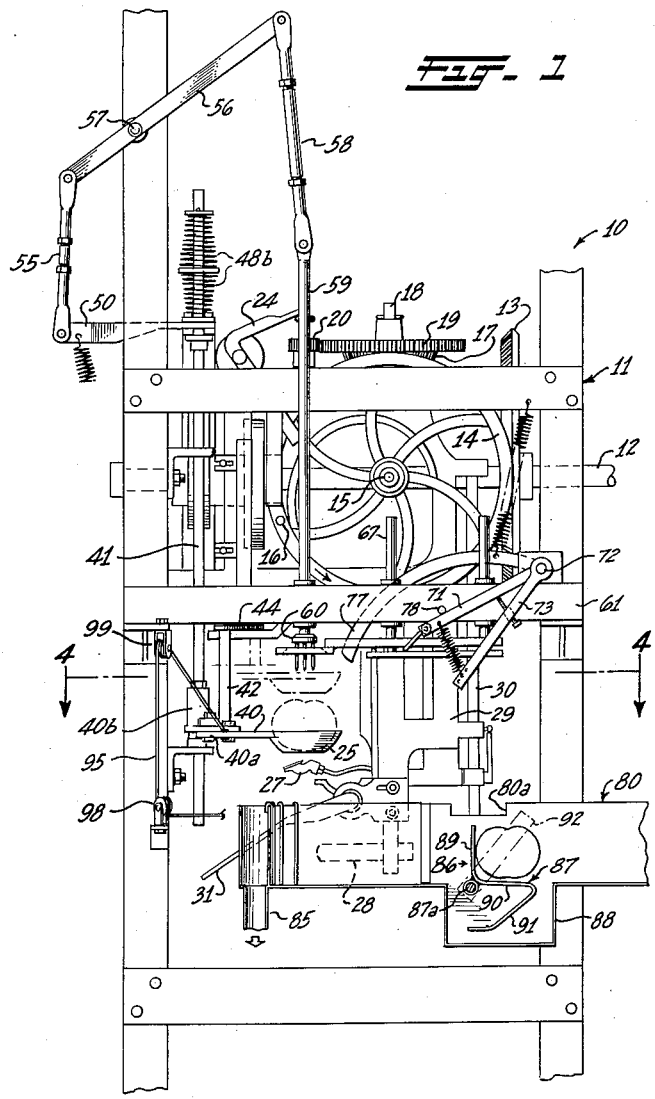
FIGURE 1 is a view in side elevation of the machine with certain portions broken away or shown in section.

Referring now to the drawings and primarily to FIGURE 1 the machine as a whole is designated by the reference numeral 10. It comprises a framework 11 which supports the various elements of the machine. Journalled in this framework is a main drive shaft 12 which carries certain cams described hereinafter and to which is also fixed a main drive gear 13. The gear 13 is an interrupted gear as and for a purpose described hereinafter. The gear 13 meshes with and drives a cam gear 14 which is mounted on a shaft 15 journalled in the framework of the machine. On the cam gear 14 is a stud 16 having a function described hereinafter. As will be apparent from a reading of the above-mentioned Pease Reissue Patent 17,307 the cam gear 14 has several other studs (not shown herein) which actuate certain operating parts of the machine in properly timed sequence. The cam gear 14, besides acting as a cam or timing element, also serves to drive a mating bevel gear 17 fixed to a shaft 18 which also supports a gear 19 which meshes with a pinion 20. As best shown in FIGURE 3 the pinion 20 is fixed to a tubular fork member 21 having tines 22 at its lower end for a purpose described hereinafter. Shown pivoted on the machine is a knock-out lever 24 which is operated by the cam gear 14 in the manner described in the Pease reissue patent, in conjunction with a knock-out rod (not shown), to eject the core from the apple after the core has been severed.

As shown in all of the figures except FIGURE 5, there is provided a cup or receptor member 25. This is the cup referred to hereinabove. As best shown in FIGURE 4, the cup 25 is not only open at the top but also has an opening 25a at the bottom. It is this cup which is present as a standard piece of equipment on the Pease machine and in which, in accordance with the prior practice, an apple is deposited by a human operator at the appropriate moment during each cycle of operation of the machine. It is an important function of the present invention that apples are placed automatically in this cup in properly timed relation to operation of the machine as a whole, thereby dispensing with human labor for the purpose.

Referring to FIGURE 1, a paring knife 27 and a coring instrument 28 are carried by a carrier member or slide frame 29 which is slidable on rods one of which is shown at 30. As described in Pease Reissue Patent 17,307 at the appropriate moment during each cycle the slide frame 29 moves up and the coring instrument 28 and the paring knife 27 are brought into operative engagement with an apple held by the fork 21, all in properly timed sequence. Further description of these elements of the machine and their mode of operation are unnecessary for the purpose of explaining the present invention.

Referring to FIGURE 3, the shaft 12 carries two cams 35 and 36. The pivot cam 35 serves to pivot the cup 25 from its "out" to its "in" position and the lifter cam 36 serves to lift the cup 25 from its "down" to its "up" position, as described generally hereinabove and as described in more detail hereinafter. The cams 35 and 36 are those employed heretofore on the Pease machine and are described in the Pease patent. However, a lobe 37 is added to the cam 36 for a purpose described hereinafter. A retainer member 38 is also added, and is shown in FIGURE 6.

As shown in FIGURES 1 to 4 the cup 25 is carried by an arm 40 which is adjustably connected to a bracket 40a having a collar 40b which is rotatably but nonslidably mounted on a rod 41. The rod 41 is slidably mounted in frame brackets. A guide rod 42 is provided which is fixed to and extends upwardly from the bracket 40a and which is slidable in a draw bar 44. The draw bar 44 (see FIGURE 3) is slidable in frame brackets such as that shown at 45 and it has an upward extension or cam follower portion 46 which is engaged by the above-mentioned pivot cam 35. It will be seen, that during each revolution of the cam shaft 12 the cam follower portion 46, and with it the draw bar 44 will be moved from right to left (as viewed in FIGURE 3). As a consequence the cup 25 will be rotated from the position shown in broken lines to the position shown in solid lines in FIGURE 3. A spring 47 connected at one end to the draw bar 44 and at the other end to the framework 11 of the machine functions to return the draw bar 44 and to restore the cup 25 to the position shown in broken lines in FIGURE 3.

As explained above, it is also necessary to impart to the cup 25 a vertical movement from its "down" position to its "up" position. For this purpose there is provided a lever 48 which is pivoted on the frame at 48a and which has a cam follower extension 49 which rides on the lifter cam 36. The lever 48 is attached to the upper portion of the lifter rod 41. Springs 48b are provided to absorb shock. The lifter mechanism provided by the cam 36, cam follower 49 and lever 48 is substantially that of the prior Pease machine and that described in the Pease reissue patent. In accordance with the present invention, however, there is provided an arm 50 which is connected to the arm 48 and moves therewith. Referring to FIGURE 1, the arm 50 is pivotally connected to an adjustable link 55 which in turn is pivotally connected to a lever 56 which is pivoted at 57 on the framework of the machine. Preferably the pivot member 57 (see also FIGURE 3) has an eccentric mounting so that a fine adjustment can be effected with regard to the placement of the axis about which the lever 56 pivots. The other end of the lever 56 is pivotally connected to another adjustable link 58 which is pivotally connected at its lower end to a spearing rod 59. To the lower end of the spearing rod 59 are attached tines 60. The rod 59 extends slidably through a mounting member 61. As best shown in FIGURE 2 the member 61 is fixed to the framework of the machine and it serves as a support and guide for the rod 59 and for certain other parts of the machine as described hereinafter.

Referring now more particularly to FIGURE 2, a ring-shaped stripper 65 is provided which is supported at one end of a bar 66 in coaxial relation to the rod 59 and tines 60, and in coaxial relation to the cup 25 when the latter is in its "out" position. The bar 66 is fixed to the lower ends of two guide rods 67 which are slidably mounted in the mounting member 61. A second bar 68 is fixed to and spaced from the bar 66 to form a slot 69 to receive a finger 70 which is adjustably connected to the lower end of a lever 71. The lever 71 is loose on a shaft 72 which is journaled in an extension 61a of the mounting member 61. A second lever 73 is fixed to the shaft 72 so as to rotate therewith. A yieldable connection is provided between the mast and loose levers 73 and 71 by means of a spring 74 connected to one of several holes 75 in the fast lever 73 and connected at its other end to the loose lever 71. A cap screw 76 threaded through the fast lever 73 limits the degree to which the lever 71 can approach the lever 73. Fixed to the other end of the pivot shaft 72 is an arcuate cam lever 77 which is operated by the stud 16 on cam gear 14 which is mentioned hereinabove. It will be apparent that as the cam gear 14 rotates in counterclockwise direction as viewed in FIGURE 2, during each revolution the stud 16 will contact the cam lever 77 and will rotate the same in counterclockwise direction as viewed in FIGURE 2, thereby rotating the fast lever 73 similarly. The latter, acting through the spring 74, will pull the loose lever 71 down and with it the two bars 66 and 68 and the apple stripping ring 65. The purpose and the timing of this operation are described hereinafter. The return travel of lever 77 is limited by a stop 78.

In operation and as thus far described the machine functions as follows: As will be apparent from an inspection of FIGURE 1, the apple spearing rod 59 undergoes a downward stroke each time the rod 41 undergoes an upward stroke. The timing of the machine as heretofore constructed and as described in the aforesaid Pease reissue patent, is such that the rod 41 undergoes its upward stroke when the apple receptor cup 25 is in its "in" position shown in solid lines in FIGURE 3. Therefore, it is apparent that the apple spearing rod 59 and its tines 60 undergo their downward stroke, through the stripper ring 65, only when the cup 25 is in its "in" position and while the rod 41 is undergoing an up stroke. At the bottom of their downward stroke the tines 60 spear an apple which has been delivered to a pick-up position in registry with the tines 60 by the means described hereinafter. The preceding apple in cup 25 is impaled on the fork 22 (see FIGURE 3). Then the rod 41 undergoes a down stroke and the apple spearing rod 59 and the tines 60 undergo an up stroke with the next apple impaled on the tines 60. At the end of the down stroke of the rod 41 the cam 35 will release the draw bar 44 from the position shown in FIGURE 3 and the spring 47 will act to pivot the cup 25 from its "in" position shown in solid lines to its "out" position shown in broken lines in FIGURE 3. The cam lobe 37 on cam 35 acts on the cam follower 49 to give the lever 48 a slight upward increment of movement. This, of course, will impart to the cup 25 a slight upward movement, from the lower position to the higher position shown in FIGURE 1. It will also be apparent that the apple spearing rod 59 and tines 60 will be given a slight increment of downward movement. The combined upward movement of cup 25 and downward movement of tines 60 act to deposit the apple firmly and squarely in the cup 25.

It is still necessary to strip the apple from the tines 60, which is accomplished as follows: At this instant in the operation of the machine, the stud 16 on cam gear 14 contacts the cam lever 77 (see FIGURE 2) and imparts to the shaft 72 and associated elements an increment of rotary movement in counterclockwise direction as viewed in FIGURE 2. The effect of this, acting through the finger 70 and the bars 66 and 68, is to give the stripper ring 65 a short downward increment of movement which strips the apple from the tines 60 and leaves it in the cup 25. This stripping action is timed to occur as the cam lobe 37 releases the cam follower 49 (see FIGURE 3). Therefore the apple is stripped from the tines 60 and deposited in the cup 25 as these two elements recede from one another. By this means it will be apparent that an apple previously impaled on the tines 60 is accurately deposited in the cup 25 at the appropriate instant in the cycle of operation of the machine, that is to say, while the preceding apple is undergoing coring and paring.

Referring now to FIGURES 4 and 5 as well as to FIGURE 1, an apple conveyor assembly is there shown in generally designated by the reference numeral 79. This assembly comprises a flume or trough 80 which branches off of a main flume or trough 81. Water is caused to flow through the main flume 81 to float apples in the direction indicated and past several machines 10 of the character of that shown in FIGURE 1. Each of the machines 10 is provided with a branch trough flume 80 which has a notch at 80a to control the level of water in the trough. An adjustable end member 82 is provided having angle-shaped flanges 82a which slidably engage the upper edges of the side walls of the trough 80. At its closed end the adjustable member 82 is formed with drain holes 83 and rods or heavy wires are provided at 84 adjacent the holes 83 for a purpose described hereinafter. A drain pipe is provided at 85 for draining water from the branch trough 80. A flipper mechanism is provided which is generally designated by the reference numeral 86 and which is formed by rods 87 fixed to a shaft 87a journaled in the sides of the branch flume 80. As best shown in FIGURE 1 a recess or well 88 is formed in the trough 80 to receive and clear the lower portion of the flipper 86. Each rod 87 of flipper 86 has a normally vertical portion 89, a normally horizontal portion 90 and a downwardly extending diagonal portion 91. A lever is provided at 92 which is fixed at one end to the shaft 87a and at its other end to a spring 93 which is also fixed at 94 to the trough 80. A cable 95 is also fixed to the lever 92 and it is operated by the means and in the manner described hereinafter.

Pausing at this point it will be apparent, from an inspection of FIGURE 1, that as apples float toward the closed end of the trough 80 each in turn will come to rest on the cradle formed by the flipper 86. When the shaft 87a is caused to rotate in counterclockwise direction as viewed in FIGURE 1, the apple so cradled will be delivered to the closed end of the trough 80 and the diagonal portion 91 of the flipper bars 87 will, as shown in FIGURES 4 and 5, prevent the next apple from progressing any further. Since it is desired to deliver only one apple at a time to the tines 60 and since apples vary in diameter, a gauge plate 96 is provided which is adjustably connected to one side of the trough 80 by connector means 97. Therefore, if apples of larger diameter are being processed the plate 96 is moved closer to its adjacent wall of the trough 80 and if apples of smaller diameter are being processed the plate 96 is moved closer to the opposite wall, so that only one apple at a time can reach the flipper 86.

As stated above, the end closure 82 is adjustable by sliding its flanges 82a along the upper edges of the side walls of the trough 80. The purpose of this is as follows: The current of water flowing through the trough 80 and out the pipe 85 will carry each apple delivered by the flipper 86 to the end of the member 82. This member is adjusted so that each apple as it reaches the end of its travel will be in registry with the spearing tines 60. Also I take advantage of the fact that apples float in water with their stem ends uppermost. Therefore when the spearing rod 59 and tines 60 descend and spear an apple it will be in properly oriented position with its stem end uppermost.

It will, therefore, be apparent that the assembly 80 shown in FIGURES 1, 4 and 5 is very well adapted to supply apples, one-by-one, each in a predetermined position in relation to a vertically moving spearing instrument and with each apple properly oriented.

For the purpose of actuating the flipper 86, as stated a cable 95 is provided. Referring now to FIGURE 1 it will be seen that the cable 95 passes over pulleys 98 and 99 which are connected to the framework of the machine. One end of the cable 95 is connected to the lever 92 while the other end is connected to the arm 40 which supports the cup 25. From the description hereinabove of the operation of the cup 25, it will be apparent that, when the cup is in its "out" position tension on the cable 95 will be relaxed and the spring 93 will hold the lever 92 in the position as shown in FIGURE 1. When the cup 25 is pivoted to its "in" position the cable 95 will be pulled and it will move the lever 92 from right to left as viewed in FIGURES 4 and 5, thereby rotating the flipper 86 and flipping an apple into the end portion 82 of the assembly 80. As explained above, the apple so delivered will be carried by the current of water to the end of the member 82 in abutment with the wires 84, which prevent the apples from plugging the drain holes 83 and reduce friction as apples are lifted by tines 60. While the cup 25 is in its "in" position and is moving from its "down" to its "up" position the spearing rod 59 and tines 60 will undergo their down stroke as explained hereinabove and will stab and spear the apple which has just been delivered to the spearing position. Then, after the preceding apple has been impaled on the fork 22 the cup 25 will be moved to its down position and the spearing rod 59 and tines 60 will undergo their up stroke. The cup 25 will then be rotated from its "in" position to its "out" position which will relax the tension on the cable 95 thereby rotating lever 92, shaft 87a and flipper 86 to the position shown in FIGURE 1 in readiness for the next apple.

Among other advantages of the invention may be mentioned the following: The pressure applied to a fruit as it is stripped from the tines 60 and deposited in the cup 25, is controllable by the position of the finger 70 and by adjustment of the screw 76. Also, if an apple is oversized the spring 74 will stretch to accommodate it and will avoid damage by exceptionally high pressure between the ring 65 and the cup 25. Referring to FIGURE 6, cooperable retainer members 110 and 111 on the lobe 37 of lifter cam 36 and on cam follower 49 act to keep the follower 49 from being lifted off the cam when the pressure of the stripper ring 65 reacts against an apple. The members 110 and 111 are parts of mechanism 38.

It will, therefore, be apparent that an automatic apple paring machine has been provided with an automatic apple feed mechanism which is effective to supply apples in sequence to a pick-up point in properly oriented position and to pick up each apple from its pick-up point and deliver it to the machine in properly oriented position and in precisely timed relationship to the cycle of operation of the machine.

Although my invention has been described with reference to an apple paring machine it will be apparent that it can be used with other machines for processing other fruits and vegetables.

We claim:

1. A fruit feed mechanism of the character described comprising a trough for floating fruit to a predetermined position, said trough having an inlet and an outlet for flow of water therethrough to float fruit to said predetermined position, a fruit flipper intercepting the travel of fruit from the inlet toward the outlet and operable to deliver fruit, one-at-a-time, to said predetermined position and a fruit spearing mechanism operable to move in a vertical direction between an up position and a down position and operable in said down position to spear fruit at said predetermined position.

2. An apple feed mechanism for supplying apples singly to a processing machine comprising an apple receptor movable between a receiving position and a delivery position, an apple spearing member movable vertically between a down position for spearing apples and an up position in close proximity to and in registry with said receptor when the latter is in its out position, a stripper operable to strip an apple from said spearing member at its up position to deposit the same in said receptor, a trough having a water inlet and a water outlet for flow of water to float apples to a pick-up position in registry with said spearing member, and a control mechanism for intercepting apples as they float toward said pick-up position and for supplying apples singly to such position.

References Cited in the file of this patent

UNITED STATES PATENTS

| | | |
|---|---|---|
| 1,445,997 | Coons | Feb. 20, 1923 |
| 2,070,311 | Pease | Feb. 9, 1937 |
| 2,850,062 | Bowman | Sept. 2, 1958 |